May 7, 1963     R. L. PROPST     3,088,178
CONNECTOR
Filed Aug. 26, 1960
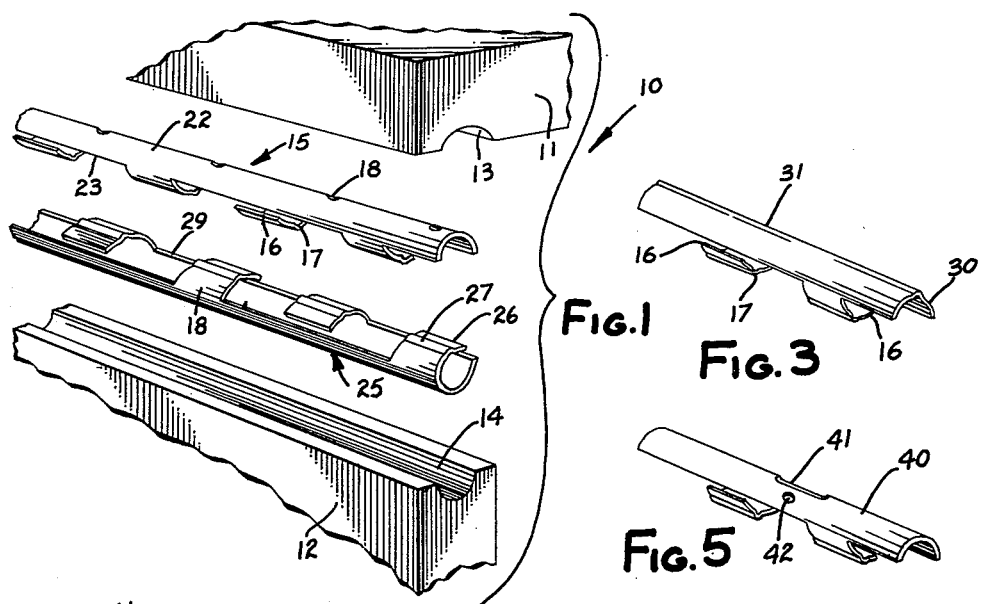
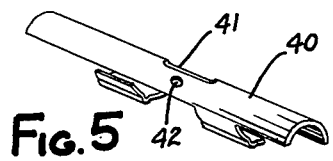
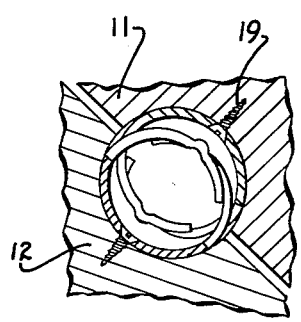
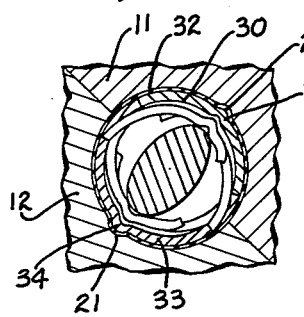
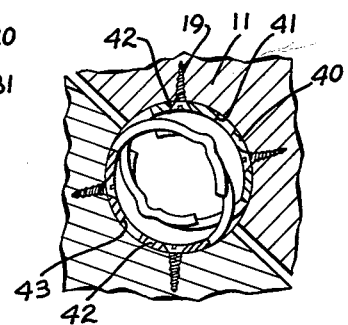
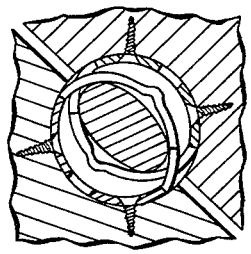
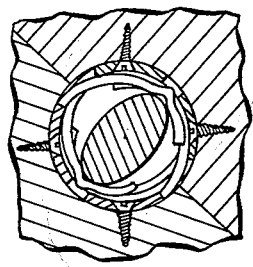
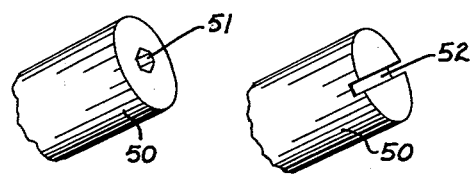
INVENTOR
ROBERT L. PROPST
BY *Price and Heneveld*
ATTORNEYS

United States Patent Office 3,088,178
Patented May 7, 1963

3,088,178
CONNECTOR
Robert L. Propst, Englewood, Colo., assignor to Herman Miller, Inc., Zeeland, Mich., a corporation of Michigan
Filed Aug. 26, 1960, Ser. No. 52,130
5 Claims. (Cl. 20—92)

This invention relates to a connector, and more particularly to a connector for joining together materials such as pieces of furniture.

There are many ways and means of joining together two pieces of furniture. One of the best known ways is to rabbet the pieces of furniture to be joined and then glue the rabbeted joint. Another manner of fastening pieces of furniture is to join the pieces together by gluing and then reinforcing the joint by angle braces which are screwed or glued to the furniture pieces. These are just a few of the various methods used. Although these fastening methods are adequate, it is usually necessary to erect the furniture at the factory when such methods are practiced. It is not always desirable to assemble the furniture at the factory, due to the fact that assembled furniture greatly increases the cost of shipping and therefore the final cost of the furniture.

Thus, it is an object of this invention to disclose a connector which can be used to assemble furniture after it has reached its destination. The furniture can then be assembled by the wholesaler, retailer or even the purchaser. This connector can have elements thereof installed initially at the point of manufacture and later assembled by merely inserting means which will lock the pieces of furniture together by rotation of the means with a conventional household tool.

It is an object of this invention to provide a connector which can be readily secured to furniture piece by fasteners such as screws or by bonding.

Another object of this invention is to provide a connector which has interengaging elements which are identical, whereby the elements are interchangeable with each furniture piece.

A further object of this invention is to provide a connector having elements with resilient fingers positioned at equally spaced intervals throughout, the element being secured to the furniture pieces in a manner so that the fingers of one element may interengage with the other element and vice versa.

Another object of this invention is to provide a connector having spreader means which pass between interengaged fingers in one position and when rotated spread the fingers into engagement with the bodies of the connector elements, joining the elements together.

Still another object of this invention is to provide the fingers with detents for locking the connectors in a given position when the fingers thereof are spread by spreader means.

Another object of this invention is to provide a connector which can be drawn together with a household tool such as a screwdriver.

Other objects coming within the scope of this invention will become obvious upon reading the following specification in conjunction with the drawings, wherein:

FIG. 1 is a perspective view of the connector assembly showing the elements thereof in an exploded position;

FIG. 2 is a cross sectional view showing the connector elements of FIG. 1 secured to furniture pieces and in initial interengaging position;

FIG. 3 is a perspective view of a modified form of a connector element;

FIG. 4 is a cross sectional view showing connector elements, of the FIG. 3 type, bonded to pieces of furniture and in interengaging and locked position.

FIG. 5 is a perspective view of another modified form of connector elements.

FIG. 6 is a cross sectional view showing modified connector elements, of the FIG. 5 type, secured to pieces of furniture and in the initial interengaging position.

FIG. 7 is a cross sectional view showing the connector elements of FIG. 6 in initial interengaging position, and the spreader means positioned between the fingers which are in the retracted or unlocked position.

FIG. 8 is a cross sectional view of the connector elements, as in FIG. 7, but showing the spreader means turned so as to position the fingers in their extended or locked position.

FIG. 9 is a perspective view of the spreader or locking mechanism shown with an Allen-type wrench fitting.

FIG. 10 is a perspective view of a spreading or locking mechanism having a screwdriver-type fitting.

This invention relates basically to a device for connecting two pieces of material such as pieces of furniture. This is accomplished by routing or in some other manner machining the pieces of material to be joined and forming grooves or flutes therein. A sleevelike connector element, having parts thereof removed or blanked, forming projecting resilient fingers and a body portion, has the body portion thereof secured to the groove or flute formed in one of the pieces. The other piece of material is provided with an identical connector element but in a reverse manner to the first element so that the resilient fingers of the first element pass wthin the blanks of the second element. Thus, the fingers of the first and second elements interengage. A spreader member which is elliptical-shaped in cross sectional configuration passes between the interengaged fingers of the connector elements. This is accomplished by passing the major axis of the spreader along the bases of the projecting fingers. The spreader means is then rotated so that the major axis thereof is displaced ninety degrees and appears transverse to the base portion of the projecting fingers, or the minor axis of the spreader means aligns with the juncture line of the pieces of material. The projecting fingers of each connector element will then be forced into engagement with the body portions of the opposite connector elements, drawing the connector elements with the piece of material secured thereto into tight engagement, one with the other.

Referring now specifically to the drawings, FIG. 1 shows an exploded view of the connector assembly designated generally as 10. The assembly is composed of several basic elements which include the material pieces 11 and 12, a first connector element 15, a second connector element 25, and the spreading or locking means 50 which joins the connecting elements together.

Two pieces of almost any type of material that have edges which are to abut each other can be joined by this type of connector. For reference purposes, the material in this application will be referred to as furniture pieces. FIG. 1 shows a first furniture piece 11 and a second furniture piece 12. The furniture piece 11 is provided with a groove or flute 13 by routing or some other machining process. The piece 12 is provided with a similar groove or flute 14 in a manner so that when the flutes 13 and 14 are aligned, the side of piece 11 will appear flush with the edge of piece 12. The flutes 13 and 14 are generally semi-circular in cross sectional configuration.

The first connector element is designated generally as 15. The connector element 15 is a sleevelike or tube-like member. It is an elongated member having a semicircular body portion 22 which is adapted to seat within the flute 13 of piece 11. Blanks 23 are formed in the element 15 at equally spaced intervals throughout the length thereof. After the blanks have been removed, projections or fingers 16 remain. The connector element 15 is made of material which is resilient so that the fingers 16 are in effect springs. The blanks 23 are formed so that the fingers 16 project from alternate sides of the body 22 at their spaced intervals along the length. Wrinkles or detents 17 are also formed in the fingers 16 and project outwardly from the central portions thereof for purposes which will be explained more fully hereinafter. The fingers are shortened somewhat by the detents or wrinkles. The body 22 is provided with apertures 18 to allow fasteners such as 19 to pass therethrough and secure the connector element to the furniture piece.

The spring fingers 16 are bent toward the body 22 to a position approximate the body. The fingers in this position, when considered with the body, form a configuration which approaches an ellipsoid when viewed in cross-section. Thus the fingers 16 are free to expand or extend from their normal position and when so extended they are biased toward their normal position due to their inherent resiliency.

The second connector element is designated generally as 25. This element is identical to the first connector element but its body 28 is secured to the second furniture piece 12 in a reverse end to end manner to the way the first connector element is connected to the first piece 11. Thus, the fingers 26 of element 25 are aligned with the blanks 23 in the first connector element 15 and the fingers 16 of the first element 15 are aligned with the blanks 29 of the second connector element 25. The fingers 26 are provided with detents 27 in a similar manner to the detents 17 of fingers 16.

FIG. 2 shows the first connector element 15 secured to the first piece 11 and the second connector element 25 secured to the second piece 12. FIG. 2 also shows how the fingers 16 fit within the blanks 29, and how the fingers 26 fit within the blanks 23. The first and second connector elements are shown in their initial interengaging position in FIG. 2. Notice that the furniture pieces 11 and 12 are still spaced from each other.

FIG. 3 shows a perspective view of a modified form of connector element 15. The connector element of FIG. 3 differs from the connector elements of FIGS. 1 and 2 in the construction of the body which is designated 30. The body 30 is provided with a centrally disposed protrusion 31 which extends throughout the length thereof. The protrusion 31 projects from the outer surface of the body 30 and is adapted to seat within the furrow 20 formed in the piece 11. This form of connector element is adapted to be bonded to the piece 11 by a proper bonding or adhesive agent 32. The engagement of protrusion 31 and furrow 20 helps to prevent rotative action on the part of the connector and therefore reduces the chances of breaking the bond. The inside surface of protrusion 31 is also adapted to receive detent 17 for purposes which will be explained in greater detail subsequently.

The piece 12 is provided with an identical connector 33 which is also reversed end to end. The piece 12 is provided with a furrow 21 to receive the protrusion 34 formed in the body 33.

FIG. 4 shows the fingers 16 and 26 of this modified form positioned within the blanks 29 and 23 of the respective members.

FIG. 5 shows a perspective view of still another modified form of connector element 15. This modified form of connector element is different from the connector elements of FIGS. 1 and 3 in the construction of the body 40. In this modification, the body 40 is provided with centrally disposed, longitudinally extending detent openings 41. The detent openings 41 are positioned at equally spaced intervals throughout the length of the connector and correspond in length to the blanks 23. The detent openings 41 are adapted to receive the detents 27 of the fingers 26 for purposes which will be explained hereinafter. The body 40 is provided with apertures 42 on either side of the detent opening 41, and are adapted to receive fasteners such as 19 to secure the connector element to the piece 11.

A second identical connector is adapted to be secured to the second piece 12 in a reverse end to end manner to the connector just described. The second connector has a body 42 which is provided with detent openings 43 in a manner similar to the detent openings 41 in body 40. The detent openings 43 are adapted to receive the detents 17 of spring fingers 16.

FIG. 6 shows the connector bodies 40 and 42 secured to pieces 11 and 12 respectively. The spring fingers 16 and 26 are shown positioned within the blanks 29 and 23 of the respective members. The fingers are shown in their retracted position.

FIG. 9 shows a perspective view of a spreader member or locking member 50. The member 50 is an elongated member which is generally elliptical in cross sectional configuration, having a major or long axis and a minor or short axis. One end of the spreader 50 is provided with an Allen wrench fitting 51. This fitting is adapted to receive an Allen wrench for purposes of rotating the spreader 50.

FIG. 10 shows a modified form of the spreader 50. This form of spreader has a slot 52 which is adapted to receive a screwdriver for rotation thereof. A spreader having a slot 52 may be used in place of a spreader having an Allen-type fitting 51, the spreader members being otherwise identical. The spreader 50 passes between the fingers 16 and 26, as shown in FIG. 7, and is rotated to expand the fingers into engagement with the opposite bodies of the respective connector elements in a manner now to be described in the assembly and operation of the connector.

Assembly and Operation

The connector assembly 10 is put together in the following manner.

The first connector 15 has a body portion thereof seated in the flute 13 of piece 11. If the first connector is to be of the type having a body, as shown in FIG. 2 and designated 22, the element is secured in position by the screws 19 which pass through the apertures 18 of the body and engage the piece 11. If the body form 30 is to be used, the piece 11 is provided with a groove 20 and the connector body bonded thereto by a bond layer 32. The body form designated 40 is secured to the piece 11 by fasteners 19 which pass through the apertures 42 on either side of the detent opening 41 and engage the piece 11.

The second connector element 25 is secured to the piece 12 in a similar manner to the first connector 15 according to the body forms used and just described. Care must be taken that the second connector element 25 is secured to the piece 12 in a reverse end to end manner with respect to the position of the first connector element 15. This is important so that the spring fingers 16 will align with the blanks 29 and the spring fingers 26 will align with the blanks 23.

The pieces 11 and 12 are brought to the initial engaging position wherein the spring fingers 16 pass into the blank areas 29 and lie in the proximity of the body 28, and the spring fingers 26 pass into the blank areas 23 and lie in the proximity of the body 22. This initial position is best shown by FIGS. 2, 6 and 7.

The next step in the assembly is to insert the spreader or locking member 50 between the spring fingers 16 and 26. This is done by placing the major axis of the elliptical configuration in parallel alignment with the plane formed by the edges of the pieces to be joined. Thus, the major axis of the spreader member passes along the extremities of the projecting spring fingers 16 and 26. Since the spring fingers 26 and 16 are bent inwardly upon the bodies of the respective members, the cross sectional configuration formed between the intersection of the spring members approaches the configuration of an ellipse and allows the passage of the elliptical-shaped spreader member 50. When the spreader member 50 has been fully inserted, the pieces 11 and 12 are now in position to be joined.

The joining operation is accomplished by inserting an Allen wrench in the fitting 51 or a screwdriver in the slot 52, depending on the type of spreader used. The spreader 50 is now rotated approximately ninety degrees so that the major axis thereof assumes a position approximately transverse to its insertion position. The minor axis of the spreader member 50 is now in a plane parallel with the joined edges of pieces 11 and 12. As the spreader member 50 rotates through this arc, the spring fingers will be extended until they lie adjacent the inner periphery of the opposite bodies. Thus, the spring fingers 16 will lie adjacent the body 28 and the fingers 26 will lie adjacent the body 22. Since the spring fingers are resilient, they strive to maintain their original position and in so doing they draw the pieces 11 and 12 into tight engagement one with the other. The pieces 11 and 12 are thus maintained in a connected position by the forces produced by the resiliency of the spring fingers.

The spreader is locked in position by its engagement with the inner peripheries of detents 17 and 27 formed in the spring fingers. This location also prevents movement of the first connector element 15 with respect to the second connector element 25.

The locking action between the connector elements is further enhanced by the configurations of the modified forms of connectors. In the embodiments shown in FIGS. 3 and 4, the detents 17 and 27 may engage the respective protrusions 34 and 31 of the connector bodies 33 and 30 if substantial movement between them takes place. This results in a locking action between the detents and the protrusions which prevents any substantial movement between the first and second connector elements.

In the modified connector elements shown in FIGS. 5 and 6, detents 17 and 27 may engage the detent openings 43 and 41 formed in the respective element bodies 42 and 40. The engagement of the detents with the detent openings in this embodiment also provides locking of the connector members.

The protrusions 31 and 34 of FIGS. 3 and 4 embodiment, and the detent openings 41 and 43 of the FIGS. 5 and 6 embodiment serve a more important function of allowing clearance between the resilient fingers 16 and 26, and the bodies of the connector elements. Wood parts tend to require broad tolerances and also tend to sink and swell even after assembly. When the connector elements are made small so as to fit within a route formed in the edge of a piece of material, for example, a piece of ¾ inch thickness, there is not necessarily a lot of working room for the resilient fingers 26 and 16. However, providing the bodies of the connector elements with protrusions 31 and 34 or detent openings 41 and 43 provides extra working clearance, especially for the detents 17 and 27 on the respective spring fingers 16 and 26. This added clearance also compensates for variations in the depth of flutes 13 and 14 in the pieces to be joined.

Thus, when spreader member 50 is inserted between the fingers and rotated, the fingers will not only cause the pieces to be joined tightly together but there will still remain sufficient working area between the bodies and the fingers to allow for expansion and contraction of the pieces.

The connector assembly 10 is disassembled in the reverse manner of assembly. Thus, it is only necessary to turn the spreader member 50 an additional quarter-turn, or reverse quarter-turn, and the spreader member can be withdrawn and the furniture pieces 11 and 12 separated.

It can be readily seen that applicant has disclosed a device for connecting pieces of material which is strong, rigid, and can be readily assembled and disassembled. The connector elements can be secured to the material pieces at the point of manufacture and the pieces joined together after they have reached their destination. The connector elements can be manufactured economically since they can be stamped from a single blank and formed into the sleeve like member having resilient fingers. Also, both connector elements are stamped using the same die. The connector elements can be made in various standard lengths. However, they are easily cut to accommodate other sizes of joints. The spreader mechanism, in combination with the detents in the spring fingers, and the depression or openings formed in the body of the connectors, provide a means for locking the material pieces in a tight joint. The pieces can be connected or released by a mere quarter-turn of the spreader member. This arrangement greatly facilitates assembly of the pieces and greatly reduces the time required for assembly.

While a preferred embodiment of this invention has been disclosed together with certain modifications thereof, it will be recognized that various modifications of this invention may be made without departing from the principles thereof. Such modifications are to be considered as included in the hereinafter appended claims unless these claims by their language expressly state otherwise.

I claim:
1. A connector for releasably securing together two pieces of material each having a generally semi-cylindrical groove formed therein, comprising: a pair of complementary connector elements, each of said elements having an axially elongated generally semi-cylindrical body of slightly less than 180° in circumferential extent, and resilient fingers semi-elliptical cross section formed at intervals along one edge of said body with the free ends thereof directed toward the other edge of said body, said fingers being spaced along said body so as to axially alternate with the fingers of the other connector element and lie generally parallel to the body of said other connector element when said connector elements are interengaged; and spreader means insertable between said fingers and rotatable to spread said fingers apart.

2. A generally cylindrical connector for joining a pair of adjacent structural parts each having a semi-cylindrical groove formed therein, comprising: a pair of trough-like body portions attached to said parts in said grooves and having a cross section generally in the form of an arc of a circle having substantially the same radius as said grooves and extending through less than 180°; resilient fingers formed on said body and spaced from one another along the length thereof, said fingers having a cross section generally in the form of a portion of an ellipse, and successive ones of said fingers on one of said body portions being positioned between successive fingers on the other of said body portions; and an elliptical spreader member, said spreader member being positioned inwardly of said fingers so as to squeeze said fingers against said body portions when said spreader member is rotated into a position where its long axis is normal to the joint of said structural parts.

3. The device of claim 2, in which successive ones of said fingers are attached alternately to one rim and the other of said trough.

4. The device of claim 2, in which said spreader member is so dimensioned that its short axis is slightly less than the short axis of the ellipse formed by said fingers, and its long axis is slightly less than the radius of said grooves.

5. The device of claim 2, in which said fingers have depressions formed therein in such a location as to engage said spreader member in the manner of a detent and hold it against further rotation when said member is rotated into said last-named position.

References Cited in the file of this patent

UNITED STATES PATENTS

| | | |
|---|---|---|
| 1,564,715 | Russell | Dec. 8, 1925 |
| 2,057,942 | Fay | Oct. 20, 1936 |
| 2,414,628 | Battin | Jan. 21, 1947 |